United States Patent [19]
Takahashi et al.

[11] Patent Number: 4,795,503
[45] Date of Patent: Jan. 3, 1989

[54] SEAM WELDED STEEL PIPE PROOFED AGAINST CORROSION AND PROVIDED WITH COATING FOR PREVENTING FLUID FROM OXIDATION AND METHOD FOR PRODUCTION THEREOF

[75] Inventors: Teruhisa Takahashi; Toshihiko Mizuhashi, both of Mishima, Japan

[73] Assignee: Usui Kokusai Sangyo Kabushiki Kaisha, Shizuoka, Japan

[21] Appl. No.: 110,322

[22] Filed: Oct. 20, 1987

[30] Foreign Application Priority Data

Oct. 23, 1986 [JP] Japan ................... 61-252651

[51] Int. Cl.$^4$ .............................................. C21D 1/00
[52] U.S. Cl. ........................................ 148/127; 148/1
[58] Field of Search ................................ 148/1, 127

[56] References Cited

U.S. PATENT DOCUMENTS 2,490,700 12/1949 Nachtman ............................ 148/127
2,637,896 5/1953 Nachtman ............................ 148/127
3,202,552 8/1965 Thexton ............................... 148/127

FOREIGN PATENT DOCUMENTS 0037125 4/1978 Japan ................................... 148/127

Primary Examiner—L. Dewayne Rutledge
Assistant Examiner—David Schumaker
Attorney, Agent, or Firm—Anthony J. Casella; Gerald E. Hespos

[57] ABSTRACT

A seam welded steel pipe proofed against corrosion and prevented from oxidizing a fluid such as gasoline to be passed therethrough is produced by a process comprising forming an Ni layer by electroplating on at least one of the opposite surfaces of a steel strip, abutting the opposite edges of said steel strip in the direction of width with the Ni layer on the inside and fusing the abutted edges, subjecting the resultant steel pipe to a heat treatment in an oxidizing atmosphere thereby forming an oxide coating on the surface of the Ni layer, acid dipping the resultant steel pipe thereby removing the oxide coating from the portion of the skin of steel exposed in the neighborhood of a bead part in consequence of the fusion, and introducing a chemical Ni plating liquid through the interior of the steel pipe thereby coating the inner surface in the neighborhood of the bead part with a Ni alloy layer by chemical plating.

5 Claims, 1 Drawing Sheet

4,795,503

SEAM WELDED STEEL PIPE PROOFED AGAINST CORROSION AND PROVIDED WITH COATING FOR PREVENTING FLUID FROM OXIDATION AND METHOD FOR PRODUCTION THEREOF

BACKGROUND OF THE INVENTION

1. Field of the Invention

This invention relates to a seam welded steel pipe which, generally to serve as a fuel pipe in an automobile or other internal combustion engine using gasoline, is provided on the inner wall surface thereof with a coating for preventing gasoline from oxidation and, further to serve concurrently as a feed pipe for various gas or liquid, is vested on the inner surface thereof with corrosionproofness and to a method for the production of the steel pipe.

2. Description of the Prior Art

Heretofore, the seam welded steel pipe of this kind has been produced by a process which comprises applying a Cu coating (12) on the inner surface of a seam welded steel pipe (11) by plating and then coating the surface of the Cu coating uniformly with a layer of Sn or a Sn alloy (13) by hot dipping throughout the entire inner surface embracing the neighborhood of a bead part (14).

In the conventional seam welded steel pipe and the method for the production thereof described above, though the aforementioned layer of Sn or Sn alloy (13) formed by hot dipping and allowed to embrace the bead part (14) curbs the formation of so-called sour gasoline to some extent by preventing the steel pipe from cauisng oxidation of gasoline, this prevention of the oxidation of gasoline cannot be attained completely because of the formation of pinholes in consequence of the deposition of layer by hot dipping. Further this formation of pinholes renders the formation of the layer (13) with tolerable uniformity by hot dipping extremely difficult and keeps the impartation of corrosionproofness from reaching a level of satisfaction. Moreover, the treatment of hot dipping itself is such as to impose limits on the diameter and length of the seam welded steel pipe to be obtained and seriously complicate the aforementioned process of treatment.

SUMMARY OF THE INVENTION

As a highly effective solution to the disadvantage suffered by the conventional seam welded steel pipe as described above, this invention aims to provide a seam welded steel tube and a method for the production thereof, which method effects the production of the seam selded steel pipe by forming on the inner surface of a seam welded steel pipe a layer of Ni possessing an oxide coating derived from a heat treatment given to the surface of the layer, acid dipping the deposited Ni layer, and then coating the inner surface in the neighborhood of a bead part with a layer of a Ni alloy by chemical plating, thereby enabling the Ni layer produced by electroplating and the Ni alloy layer produced by chemical plating to cooperate and eliminate pinholes, effectively curbing formation of sour gasoline by preventing the produced seam welded steel pipe from causing oxidation of gasoline when the steel pipe is installed in an automobile and put to use, enabling the two applied layers to cooperate and impart corrosionproofness satisfactorily to the steel pipe, allowing the treatment of electroplating and the treatment of chemical plating to be easily performed even in when the steel pipe has a small diameter and a large length, and simplifying the work involved in the treatments to a great extent.

This invention essentially resides in a seam welded steel pipe which comprises a seam welded steel pipe of a relatively small diameter provided or not provided with a Cu coating formed by plating, a Ni layer provided on the surface thereof with an oxide coating and deposited on the inner surface of the seam welded steel pipe except for the immediate neighborhood of a bead part of the steel pipe, and a layer of a Ni alloy formed by chemical plating on the inner surface in the neighborhood of the bead part and, owing to the construction described above, possesses corrosionproofness and exhibits an ability to prevent a fluid flowing through the steel pipe from oxidation and in a method for the production of a seam welded steel pipe by the steps of forming a Ni layer by electroplating on one of the surfaces of a steel strip provided or not provided in advance with a Cu coating produced by plating, converting the thus treated steel strip into a seam welded steel pipe by rounding the steel strip laterally with the deposited Ni layer on the inside, abutting the opposite edges thereof against each other in the direction of width, and fusing the abutted edges by welding, subjecting the produced seam welded steel pipe to a heat treatment in an oxidizing atmosphere thereby forming an oxide coating on the surface of the aforementioned Ni layer, then subjecting the steel pipe to an acid dipping treatment thereby removing the oxide coating from the portion of the skin of steel exposed in the neighborhood of a bead part in consequence of the fusion effected during the production of the steel pipe from the steel strip, and subsequently introducing a chemical Ni plating liquid into the interior of the steel pipe so as to form a Ni alloy layer by chemical plating on the surface in the neighborhood of the bead part, thereby enabling the produced seam welded steel pipe to possess corrosionproofness and exhibit an ability to prevent itself from causing oxidation of a fluid to be passed therethrough.

The other objects and characteristic features of the present invention will become apparent from the desdription given in further detail herein below with reference to the accompanying drawing.

DETAILED DESCRIPTION OF THE INVENTION

Figure 1:
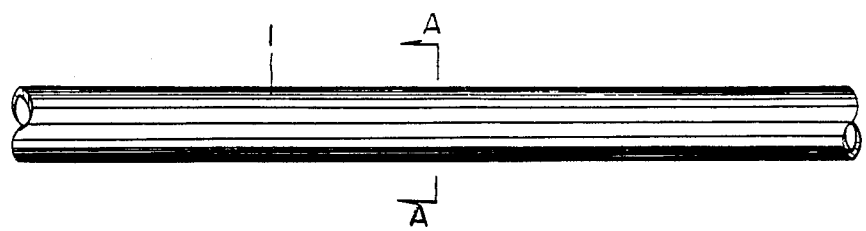
FIG. 1 is a plan view of a seam welded steel pipe which is produced by the method as one embodiment of this invention and which possesses corrosionproofness and exhibits an ability to prevent oxidation of a fluid to be passed therethrough, FIG. 2 a partial magnified cross section taken through FIG. 1 along the line A—A, FIG. 3 a diagram equivalent to FIG. 2 and illustrating another embodiment of this invention, and FIG. 4 a partial magnified cross section of a conventional seam welded steel pipe.
Figure 2:
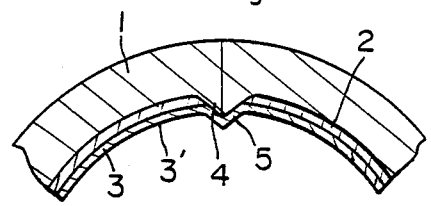
Figure 3:
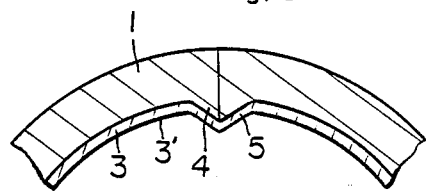
Figure 4:
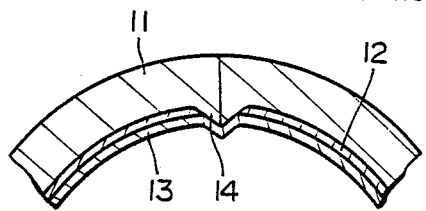

In FIG. 1 through FIG. 3, (1) denotes a seam welded steel pipe having a relatively small diameter of not more than about 30 mm and a wall thickness of not more than about 2 mm. This steel pipe is produced by forming a Ni layer in a thickness in the range of 1 to 6 $\mu$ by the conventional electroplating technique on at least one of the opposite surfaces of a steel strip provided or not provided in advance with a Cu plating (2) of a thickness in the range of 0.5 to 3 $\mu$ and thereafter rounding the steel strip laterally with the deposited Ni layer on the inside, abutting the opposite edges thereof in the direction of width, and fusing the abutted edges thereof by the electric resistance welding generally adopted in the production of a seam welded steel pipe. The seam welded steel pipe (1) thus produced is subjected to a heat treatment in an oxidizing atmosphere at a temperature in the range of about 500° C. to about 600° C. for 10 to 20 minutes so as to form an oxide coating (3') on the surface of the aforementioned Ni layer (3) except for the surface in the neighborhood of a bead part (4). Then, the steel pipe is dipped in a solution containing hydrochloric acid or sulfuric acid in a concentration approximately in the range of 7 to 20% so as to remove the oxide coating from the skin of steel exposed in the surface in the neighborhood of the bead part (4) with the oxide coating (3') left intact on the surface of the aforementioned Ni layer (3). Thereafter, the seam welded steel pipe (1) is immersed for a desired length of time in a chemical Ni plating liquid formed of a commercially available Ni-P alloy plating liquid or N-B alloy plating liquid and kept in a heated state, the chemical Ni plating liquid is circulated through the interior of the seam welded steel pipe (1) to form a layer (5) of the aforementioned Ni alloy in a thickness in the range of 1 to 6 $\mu$ on the surface in the neighborhood of the bead part (4).

As described above, the Ni layer produced by electroplating and the Ni alloy layer produced by chemical plating are both defined to have a thickness in the range of 1 to 6 $\mu$. This range is essential because the effect expected of the Ni layer or the Ni alloy layer is not obtained if the thickness is less than 1 $\mu$ and because this effect is not proportionately increased and the deposited Ni layer is susceptible of separation during the rounding of the steel strip if the thickness exceeds 6 $\mu$.

The aforementioned Ni alloy layer (5) produced by chemical plating is formed only on the surface in the neighborhood of the bead part (4). The limited deposition of the Ni alloy layer is possibly because the aforementioned acid dipping treatment removes the oxide coating from the surface in the aforementioned neighborhood and induces activation of the exposed skin of steel.

Now, the present invention will be described more specifically below with reference to working examples thereof.

EXAMPLE (1)

Seam welded steel pipe—This steel pipe was made of SPC and shaped so as to measure 6.35 mm in outside diameter, 0.7 mm in wall thickness; and 500 mm in length. It was obtained by preparing a steel strip provided in advance on one of the opposite surfaces thereof with a Cu coating formed by plating in a thickness of 2 $\mu$ and a layer of Ni formed by electroplating in a thickness of 3 $\mu$, rounding the steel strip laterally with the coated surface on the inside, abutting the opposite edges thereof against each other in the direction of width, and fusing the abutted edges by electrical reisstance welding as conventionally adopted in the production of a seam welded steel pipe.

Heat treatment—The seam welded steel pipe was subjected to a heat treatment carried out in an open air at a temperature of 600° C. for a period of 12 minutes.

Acid dipping treatment—The hot steel pipe fresh from the heat treatment was left cooling, dipped in an aqueous 15% hydrochloric acid solution at room temperature for 30 seconds, and then rinsed with water.

Deposition of Ni by chemical plating—A chemical Ni plating liquid (produced by Kanizen K. K. and marketed under product code of "S-780") heated at about 90° C. was circulated through the interior of the steel pipe for a period of 10 minutes to form a Ni-P alloy layer 3 $\mu$ in thickness on the surface in the neighborhood of a bead part which had been stripped of an oxide coating by the aforementioned acid dipping treatment.

EXAMPLE (2)

Seam welded steel pipe—This steel pipe was made of SPC and shaped so as to measure 80 mm in outside diameter, 0.7 mm in wall thickness, and 1,000 mm in length. It was obtained by following the procedure of Example (1), excepting a steel strip provided on one of the opposite surfaces thereof surfaces thereof with a Ni layer formed by electroplating in a thickness of 3 $\mu$.

Heat treatment—The steel pipe was heated in an open air at a temperature of 500° C. for a period of 17 minutes.

Acid dipping treatment—The hot steel pipe fresh from the heat treatment was dipped in an aqueous 20% sulfuric acid solution at a temperature of 50° C. for a period of 40 seconds and then rinsed with water.

Deposition of Ni by chemical plating—A chemical Ni plating liquid consisting of 30 g/liter of nickel sulfate and 30 g/liter of sodium succinate and heated to about 90° C. was circulated through the interior of the steel pipe for a period of 10 minutes so as to form a Ni-P alloy layer by chemical plating in a thickness of 3 $\mu$ on the surface in the neighborhood of a bead part stripped of the oxide coating by the aforementioned acid during treatment.

While the present invention has been described by means of specific embodiments, it is to be understood that numerous changes and modifications may be made therein without departing from the spirit and scope of the invention as defined in the appended claims.

In accordance with this invention, the inner surface of the seam welded steel pipe (1) except for the neighborhood of the bead part (4) is covered with the oxide coating (3') produced by the heat treatment which is given after the formation of the steel pipe to the Ni layer formed by electroplating before the formation of the steel pipe and, further, the surface in the neighborhood of the bead part (4) having the skin of steel exposed in consequence of the aforementioned fusion is coated with the Ni alloy layer (5) produced by chemical plating while the surface is in a state activated by the subsequent acid dipping treatment. Thus, the production of the seam welded steel pipe of the present invention can be easily accomplished by a series of simple treatments, i.e. the Ni electroplating treatment performed on the steel strip prior to conversion into a pipe, the heat treatment performed after the steel strip has been converted into the seam welded steel pipe, the acid dipping treatment, and the Ni chemical plating treatment.

As described above, the seam welded steel pipe and the method for the production thereof according with the present invention are such that, owing to the Ni layer (3) formed by electroplating and the Ni alloy layer formed by chemical plating on the surface exclusively in the neighborhood of the bead part (4), the product can be obtained in a state having the inner surface thereof completely covered without allowing occurrence of pinholes and, as the result, curbs the formation of sour gasoline by ensuring prevention of gasoline from the otherwise possible oxidation due to contact with steel and further, owing to the substantially uniform coating structure due to cooperation of the two metallic layers mentioned above, possesses satisfactory corrosionproofness. The plating treatments mentioned above can be easily applied even to the production of a seam welded steel pipe having a small diameter and a large length. The fact that the layer (5) of chemical plating is formed only on the surface in the neighborhood of the bead part (4) contributes to economizing the consumption of the expensive chemical plating liquid and also to simplifying the aforemenmentioned series of treatments. Thus, the present invention constitutes itself a precious addition to the art.

What is claimed is:

1. A method for the production of a seam welded steel pipe, comprising forming an Ni layer by electroplating on at least one of the opposite surfaces of a steel strip, abutting the opposite edges of said steel strip in the direction of width with said Ni layer on the inside and fusing the abutted edges, subjecting the resultant steel pipe to a heat treatment in an oxidizing atmosphere thereby forming an oxide coating on the surface of said Ni layer, acid dipping the resultant steel pipe thereby removing said oxide coating from the portion of the skin of steel exposed in the neighborhood of a bead part in consequence of said fusion, and introducing a chemical Ni plating liquid through the interior of said steel pipe thereby coating the inner surface in the neighborhood of said bead part with a Ni alloy layer by chemical plating.

2. The method according to claim 1, wherein a Cu coating is formed in advance by electroplating on at least one of the opposite surfaces of said steel strip.

3. The method according to claim 1, wherein said heat treatment is carried out at a temperature in the range of 500° to 600° C. for a period in the range of 10 to 20 minutes.

4. The method according to claim 1, wherein said acid dipping treatment is carried out in an aqueous solution containing hydrochloric acid or sulfuric acid in a concentration in the range of 7 to 20%.

5. The method according to claim 1, wherein said Ni chemical plating liquid is a Ni-P alloy plating liquid or Ni-B alloy plating liquid.

* * * * *